United States Patent
Wang et al.

(10) Patent No.: US 10,448,036 B2
(45) Date of Patent: Oct. 15, 2019

(54) MOTION COMPENSATION MATCHING FOR VIDEO CODING

(71) Applicant: CHUANXIAN NETWORK TECHNOLOGY (SHANGHAI) CO., LTD, Beijing (CN)

(72) Inventors: Tao Wang, Beijing (CN); Jinjie Ke, Beijing (CN); Sibin Gu, Beijing (CN); Baiyu Pan, Beijing (CN); Ji Wang, Beijing (CN)

(73) Assignee: Chuanxian Network Technology (Shanghai) Co., Ltd, Beijing (CN)

( * ) Notice: Subject to any disclaimer, the term of this patent is extended or adjusted under 35 U.S.C. 154(b) by 0 days.

(21) Appl. No.: 15/745,267

(22) PCT Filed: Sep. 13, 2016

(86) PCT No.: PCT/CN2016/098785
§ 371 (c)(1),
(2) Date: Jan. 16, 2018

(87) PCT Pub. No.: WO2017/088558
PCT Pub. Date: Jun. 1, 2017

(65) Prior Publication Data
US 2019/0007693 A1    Jan. 3, 2019

(30) Foreign Application Priority Data
Nov. 27, 2015  (CN) .......................... 2015 1 0847233

(51) Int. Cl.
*H04N 19/436*   (2014.01)
*H04N 19/513*   (2014.01)
(Continued)

(52) U.S. Cl.
CPC ......... *H04N 19/436* (2014.11); *H04N 19/513* (2014.11); *H04N 19/523* (2014.11); *H04N 19/533* (2014.11)

(58) Field of Classification Search
None
See application file for complete search history.

(56) References Cited

U.S. PATENT DOCUMENTS

| | | | |
|---|---|---|---|
| 2004/0190617 A1* | 9/2004 | Shen | H04N 19/159 375/240.16 |
| 2004/0247029 A1* | 12/2004 | Zhong | H04N 19/56 375/240.16 |

(Continued)

FOREIGN PATENT DOCUMENTS

| | | |
|---|---|---|
| CN | 103287777 | 9/2013 |
| CN | 103338377 | 10/2013 |

(Continued)

*Primary Examiner* — Rebecca A Volentine
(74) *Attorney, Agent, or Firm* — Occhiuti & Rohlicek LLP

(57) ABSTRACT

The present disclosure relates to a motion compensation matching method and system for video coding. The method comprises: a CPU extracting a current frame image and a reference frame image from a video to be processed and sending the extracted frame images to a GPU; the GPU performing interpolation process at least once on the reference frame image to obtain a plurality of interpolation images; the GPU dividing the current frame image to obtain a plurality of prediction blocks; the GPU, according to each of the prediction blocks, performing block matching search in the reference frame image and each of the interpolation images; according to a result of the block matching search, determining a motion vector of a desired image block of the current frame image. The present disclosure uses GPU to execute large amounts of computation for interpolation and division of the frame images and block matching search, and (Continued)

uses CPU to process a small amount of computation. Since GPU is used to process search, which can be the most complicated and the most energy-consuming part of the coding process, the large-scale concurrency of the graphics card can be sufficiently utilized, and thus the video coding speed can be significantly increased.

14 Claims, 7 Drawing Sheets

(51) Int. Cl.
*H04N 19/523* (2014.01)
*H04N 19/533* (2014.01)

(56) References Cited

U.S. PATENT DOCUMENTS

| | | | | |
|---|---|---|---|---|
| 2006/0056513 | A1* | 3/2006 | Shen | H04N 21/4143 375/240.16 |
| 2006/0198445 | A1* | 9/2006 | Li | H04N 19/56 375/240.17 |
| 2007/0183504 | A1* | 8/2007 | Hoffman | H04N 19/56 375/240.16 |
| 2008/0219572 | A1* | 9/2008 | Kim | H04N 19/105 382/236 |
| 2009/0022228 | A1* | 1/2009 | Wang | H04N 19/105 375/240.24 |
| 2014/0328400 | A1* | 11/2014 | Puri | H04N 19/176 375/240.13 |
| 2016/0345018 | A1* | 11/2016 | Sadhwani | H04N 19/105 |

FOREIGN PATENT DOCUMENTS

| | | |
|---|---|---|
| CN | 103384324 | 11/2013 |
| CN | 105516726 | 4/2016 |

* cited by examiner

MOTION COMPENSATION MATCHING FOR VIDEO CODING

CROSS-REFERENCE TO RELATED APPLICATION

This application is the national stage, under 35 USC 371 of PCT application PCT/CN2016/098785, filed on Sep. 13, 2016, and claims the benefit of Chinese Patent Application No. 201510847233.X, filed on Nov. 27, 2015, the entire contents of which are incorporated herein by reference.

TECHNICAL FIELD

The present application relates to the field of multimedia technology, in particular, a motion compensation matching method and a motion compensation matching system for video coding.

BACKGROUND

In the technology of data compression, search algorithms are used for video coding. Search algorithms include Full Search Method (FSM), Diamond Search (DS), Three Step Search (TSS), Four Step Search (FSS), octagonal algorithm, double cross algorithm, etc. Some search algorithms are based on a reference macroblock of the context. These algorithms can refer to the context, utilize the similarity of regional image movement, and optimize and adjust the central processing unit (CPU) so as to obtain good picture quality and coding speed.

However, because the above algorithms are algorithms based on the search patterns provided by the CPU, as the image resolution and frame rate increase greatly, parallel processing of the CPU may not be able to fulfill the requirement for precise image processing. For some search algorithms executed on a CPU, problems such as slow processing speed and low accuracy may occur.

SUMMARY

In one aspect, in general, the present disclosure describes some embodiments that address the following technical problem: how to perform motion compensation for video coding to more rapidly and precisely obtain the motion vector of the desired image block, so as to reduce the compression time and improve the coding quality.

In order to solve the above technical problem, the present disclosure, according to one embodiment, provides a motion compensation matching method for video coding, comprising:

a central processing unit CPU extracting a current frame image and a reference frame image from a video to be processed and sending the extracted frame images to a graphics processing unit GPU;

the GPU performing interpolation process at least once on the reference frame image to obtain a plurality of interpolation images;

the GPU dividing the current frame image to obtain a plurality of prediction blocks;

the GPU, according to each of the prediction blocks, performing block matching search in the reference frame image and each of the interpolation images;

according to a result of the block matching search, determining a motion vector of a desired image block of the current frame image.

Regarding the above method, in one possible implementation, the GPU, according to each of the prediction blocks, performing block matching search in the reference frame image and each of the interpolation images comprises:

the GPU, according to a position of the prediction blocks, performing a first diamond cell matching search in the reference frame image to determine a position and a motion vector of a desired whole pixel region;

for each of the interpolation images, the GPU, according to the position of the desired whole pixel region, performing a second diamond cell matching search in the interpolation images to determine a position and a motion vector of a desired sub-pixel region.

Regarding the above method, in one possible implementation, the GPU, according to a position of the prediction blocks, performing a first diamond cell matching search in the reference frame image to determine a position and a motion vector of a desired whole pixel region comprises:

the GPU, according to the position of the prediction blocks, determining a center of a first diamond region in the reference frame image, and selecting a plurality of first square regions in the first diamond region;

according to vertex pixels of the first diamond region and boundary pixels of each of the first square regions, determining a plurality of first search blocks in the reference frame image and comparing pixels of each of the first search blocks with pixels of the prediction blocks;

respectively performing sum of absolute difference SAD (Sum of Absolute Difference) convergence on a comparison result corresponding to each of the first search blocks, and obtaining a position and a motion vector of a reference block according to a result of the convergence, then performing block-wise averaging with regard to each first search block according to the reference block, so as to determine the position and the motion vector of the desired whole pixel region.

Regarding the above method, in one possible implementation, the GPU, according to the position of the desired whole pixel region, performing a second diamond cell matching search in the interpolation images to determine a position and a motion vector of a desired sub-pixel region comprises:

the GPU, according to the position of the desired whole pixel region, determining a center of a second diamond region in the interpolation images, and selecting a plurality of second square regions in the second diamond region;

according to vertex pixels of the second diamond region and boundary pixels of each of the second square regions, determining a plurality of second search blocks in the interpolation images and comparing pixels of each of the second search blocks with pixels of the prediction blocks;

respectively performing SAD convergence on comparison result corresponding to each of the second search blocks, and according to the result of the convergence, obtaining a position and a motion vector of the desired sub-pixel region.

Regarding the above method, in one possible implementation, according to a result of the block matching search, determining a motion vector of a desired image block of the current frame image comprises:

the GPU sending the position and the motion vector of the desired sub-pixel region of the prediction blocks to the CPU;

the CPU determining whether or not the position of the desired sub-pixel region is located in a boundary region of the first diamond region;

if yes, the CPU according to the position and the motion vector of the desired sub-pixel region calculates the motion vector of the desired image block of the current frame image; otherwise, the CPU determines the motion vector of the desired sub-pixel region as the motion vector of the desired image block of the current frame image.

Regarding the above method, in one possible implementation, the GPU performing interpolation process at least once on the reference frame image to obtain a plurality of interpolation images comprises:

the GPU according to the reference frame image, initiating multiple parallel threads to execute half pixel interpolation process, so as to obtain half pixel interpolation images;

the GPU according to the reference frame image and the half pixel interpolation images initiating multiple parallel threads to execute ¼ pixel interpolation process, so as to obtain ¼ pixel interpolation images.

In order to solve the above technical problem, according to another embodiment, the present disclosure provides a motion compensation matching system for video coding, comprising:

a CPU for extracting a current frame image and a reference frame image from a video to be processed and sending the extracted frame images to a GPU;

the GPU that is connected with the CPU, for receiving the current frame image and the reference frame image from the CPU, that performs interpolation process at least once on the reference frame image to obtain a plurality of interpolation images; that divides the current frame image to obtain a plurality of prediction blocks; that according to each of the prediction blocks, performs block matching search in the reference frame image and each of the interpolation images;

the CPU being further used for determining a motion vector of a desired image block of the current frame image according to a result of the block matching search.

Regarding the above system, in one possible implementation, the GPU comprises:

a first matching search module for performing a first diamond cell matching search in the reference frame image according to the position of the prediction blocks, so as to determine a position and a motion vector of a desired whole pixel region;

a second matching search module that is connected with the first matching search module, which, with regard to each of the interpolation images, is used for performing a second diamond cell matching search in the interpolation images according to the position of the desired whole pixel region, so as to determine a position and a motion vector of a desired sub-pixel region.

Regarding the above system, in one possible implementation, the first matching search module comprises:

a first diamond cell unit for determining a center of a first diamond region according to the position of the prediction blocks, and selecting a plurality of first square regions in the first diamond region;

a first matching unit that is connected with the first diamond cell unit, for determining a plurality of first search blocks in the reference frame image according to vertex pixels of the first diamond region and boundary pixels of each of the first square regions, and comparing pixels of each of the first search blocks with pixels of the prediction blocks;

a first convergence unit that is connected with the first matching unit, for respectively performing sum of absolute difference SAD convergence on a comparison result corresponding to each of the first search block, and obtaining a position and a motion vector of a reference block according to the result of the convergence, then performing block-wise averaging with regard to each first search block according to the reference block, so as to determine the position and the motion vector of the desired whole pixel region.

Regarding the above system, in one possible implementation, the second matching search module comprises:

a second diamond cell unit for determining a center of a second diamond region in the interpolation images according to a position of the desired whole pixel region, and selecting a plurality of second square regions in the second diamond region;

a second matching unit that is connected with the second diamond cell unit, for determining a plurality of second search blocks in the interpolation images according to vertex pixels of the second diamond region and boundary pixels of each of the second square regions, and comparing pixels of each of the second search blocks with pixels of the prediction blocks;

a second convergence unit that is connected with the second matching unit, for respectively performing SAD convergence on a comparison result corresponding to each of the second search block, and according to the result of the convergence, obtaining a position and a motion vector of the desired sub-pixel region.

Regarding the above system, in one possible implementation, the GPU is further used for sending the position and the motion vector of the desired sub-pixel region of the prediction blocks to the CPU;

the CPU is further used for determining whether or not the position of the desired sub-pixel region is located in a boundary region of the first diamond region; if yes, the CPU, according to the position and the motion vector of the desired sub-pixel region, calculates a motion vector of the desired image block of the current frame image, otherwise, determines the motion vector of the desired sub-pixel region as the motion vector of the desired image block of the current frame image.

Regarding the above system, in one possible implementation, the GPU further comprises: an interpolation module for initiating multiple parallel threads to execute half pixel interpolation process according to the reference frame image, so as to obtain half pixel interpolation images; and according to the reference frame image and the half pixel interpolation images, initiating multiple parallel threads to execute ¼ pixel interpolation process, so as to obtain ¼ pixel interpolation images.

Aspects can provide one or more of the following advantages. Some embodiments of the present disclosure use GPU to execute large amounts of computation for interpolation and block division of the frame images and block matching search, and use CPU to process a small amount of computation. Since GPU can be used to process search, which can be the most complicated and the most energy-consuming part of the coding process, the large-scale concurrency of the graphics card can be sufficiently utilized, and thus the video coding speed can be significantly increased.

Additional features and aspects of the present disclosure will become apparent from the following description of exemplary examples with reference to the attached drawings.

BRIEF DESCRIPTION OF THE DRAWINGS

The drawings, which are incorporated in and constitute part of the specification, together with the description, illustrate exemplary examples, features and aspects of the present disclosure and serve to explain the principles of the present disclosure.

DETAILED DESCRIPTION

Figure 1:
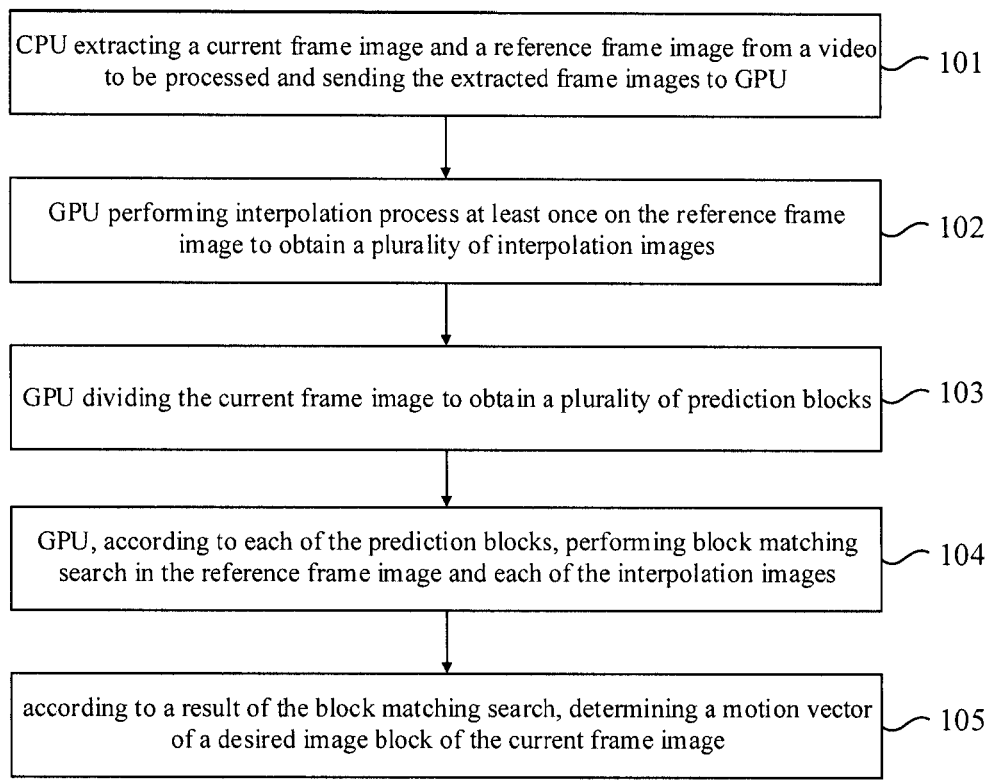
FIG. 1 is a flow chart showing a motion compensation matching method for video coding according to one embodiment of the present disclosure.

Various exemplary examples, features and aspects of the present disclosure will be described in detail with reference to the drawings. The same reference numerals in the drawings represent parts having the same or similar functions. Although various aspects of the examples are shown in the drawings, it is unnecessary to proportionally draw the drawings unless otherwise specified.

Herein the term "exemplary" means "used as an instance or example, or explanatory". An "exemplary" example given here is not necessarily construed as being superior to or better than other examples.

Numerous details are given in the following examples for the purpose of better explaining the present disclosure. It should be understood by a person skilled in the art that the present disclosure can still be realized even without some of those details. In some of the examples, methods, means, units and circuits that are well known to a person skilled in the art are not described in detail so that the principle of the present disclosure become apparent.

Embodiment 1

Video data comprises a huge amount of time redundancy. With regard to the time redundancy, there is a need to use a motion compensation method to merely transmit the residual image data so as to greatly reduce the video image data.

FIG. 1 is a flow chart showing a motion compensation matching method for video coding according to one embodiment of the present disclosure. Referring to FIG. 1, the motion compensation matching method for video coding may mainly include the following steps:

Step 101, a CPU extracts a current frame image and a reference frame image from a video to be processed and sends the extracted frame image to a GPU (graphics processor).

Specifically, the video may generally include several types of frame images, such as I-frames (intra-coded frames), P-frames (inter-coded frames), and B-frames (bidirectional prediction frames). The reference frame image is typically the frame image that the previous few frames and/or the subsequent few frames of the current frame image have been decoded. The CPU in the preparation phase may first determine the frame type of the current frame in the video to be processed, and then select the reference frame image. If the current frame image is an I-frame, the CPU merely process spatial redundancy; if the current frame image is a P-frame, the CPU may select an I-frame before the P-frame as the reference frame image; if the current frame image is a B-frame, the CPU may select an I-frame and multiple P-frames before and after the B-frame as the reference frame image. The above is merely an example for the method of the CPU selecting the reference image. The method can be flexibly selected according to the actual compression requirements.

Step 102, the GPU performs the interpolation process at least once on the reference frame image to obtain a plurality of interpolation images.

The GPU can initiate multiple, for example, 2000 parallel threads based on the size of the reference frame image and the capacity of the GPU itself (e.g., the number of parallel threads supported by the GPU and the memory processing capability of the GPU, etc.) in order to simultaneously perform the interpolation process to the reference frame image, thereby increasing the processing speed. The number of times of interpolation process can be determined according to the compression requirements. The interpolation process can be performed once or several times. In this embodiment of the present disclosure, the GPU can determine according to its capacity the number of threads to be initiated simultaneously in the interpolation process and during the division and the search process described later. For example, if a GPU can support up to 2000 threads to be initiated at the same time, it is preferred that each time of calculation for interpolation, division, search and other operations of the GPU is allocated to less than 2000 threads as far as possible, to ensure a relatively high processing speed.

For example, the GPU performs twice the interpolation process. Thus, the Step 102 may specifically include: the GPU, according to the reference frame image, initiating multiple parallel threads to execute half pixel interpolation process to obtain half pixel interpolation images; and then the GPU, according to the reference frame image and the half pixel interpolation images, initiating multiple parallel threads to execute ¼ pixel interpolation process to obtain ¼ pixel interpolation images. Taking one reference frame image as an example, 4 half pixel interpolation images can be obtained by executing the half pixel interpolation process; the 4 half pixel interpolation images can be subjected to ¼ pixel interpolation process to obtain 16 ¼ pixel interpolation images. In other words, a total of 20 interpolation images can be obtained.

Step 103, the GPU divides the current frame image to obtain a plurality of prediction blocks.

As for the method of dividing the current frame image by the GPU, the method for standard clock prediction unit division such as that used in HEVC (High Efficiency Video Coding) may be referred to. Each of the prediction blocks obtained by each division method is subjected to a subsequent block matching search from which the most suitable one or more prediction blocks are selected as the desired image blocks. The above method for dividing the prediction blocks is only an example. Other methods may also be selected based on needs in actual applications.

Step 104, the GPU performs a block matching search in the reference frame image and each of the interpolation images according to each of the prediction blocks.

Specifically, the GPU firstly performs a first diamond cell matching search in the reference frame image according to the position of the prediction blocks, to determine the position and the motion vector of the desired whole pixel region; and then, in each of the interpolation images, the GPU performs a second diamond cell matching search in the interpolation image according to the position of the desired whole pixel region, to determine the position and the motion vector of the desired sub-pixel region.

Continuing with the above example, the GPU first uses a large diamond cell matching search algorithm in one reference frame image to determine the position and the motion vector of the most suitable whole pixel region, and then uses a small diamond cell matching search algorithm in 20 interpolation images to determine the position and the motion vector of the most suitable sub-pixel region (desired sub-pixel region).

Step 105, according to the block matching search result, the motion vector of the desired image block of the current frame image is determined.

Specifically, the GPU may determine the position and the motion vector of the sub-pixel region determined in the previous step as the motion vector of the desired image block of the current frame image. The GPU may also send the position and the motion vector of the sub-pixel region to the CPU, then the CPU determines whether the position of the sub-pixel region is located in the boundary region. If the sub-pixel region is located in the boundary region, the best motion compensation block retrieved by the GPU may not be optimal. Thus, there is a need to use the CPU to recalculate based on the result of the GPU. The CPU may continue to use the existing algorithms for the calculation. For example, the CPU uses small cell and DS algorithms in a vicinity of the motion vector of the surrounding macro blocks to obtain the optimal MV (Motion Vector).

The motion compensation matching method for video coding of this embodiment uses GPU to execute large amounts of computation for interpolation and division of the frame images and block matching search, and uses CPU to process a small amount of computation. Since GPU is used to process the search, which can be the most complicated and the most energy-consuming part of the coding process, the large-scale concurrency of the graphics card can be sufficiently utilized, and thus the video coding speed can be significantly increased.

Embodiment 2

Figure 2:
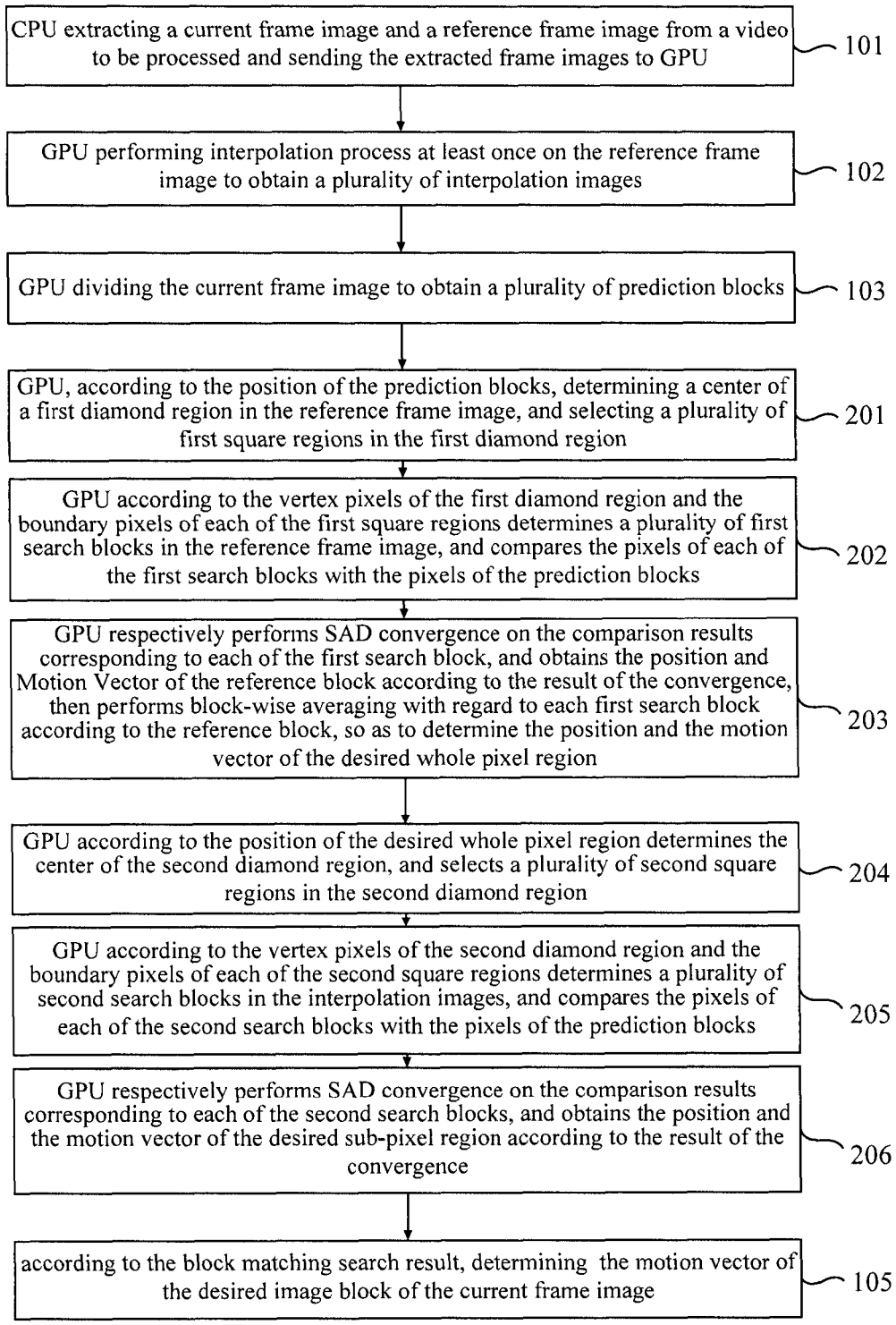
FIG. 2 is a flow chart showing a motion compensation matching method for video coding according to one other embodiment of the present disclosure.

FIG. 2 is a flow chart showing a motion compensation matching method for video coding according to one other embodiment of the present disclosure. The reference numerals in FIG. 2 that are the same with FIG. 1 represent parts having the same or similar functions. For the sake of brevity, specific description for these parts is omitted.

This embodiment is different from the motion compensation matching method for video coding as shown in FIG. 1 mainly in the following aspect: for each of the prediction blocks, the GPU may divide a number of parallel threads according to the GPU's own capacity for executing the diamond cell matching algorithm based on the whole pixel points. Similarity matched between the prediction blocks and each of the search blocks is calculated by SAD.

The main concept of the diamond algorithm is as follows: according to statistics for mass data, most motions of an object concentrate in a vertical and a horizontal direction. The vertical direction and the horizontal direction part is focused during the search. Based on the concept of diamond algorithm, multiple thread groups may run simultaneously on the GPU. The diamond shape is split into a number of small squares, so that each of the thread groups performs prediction for n individual squares to utilize the capacity of the GPU as much as possible.

In Step 104, referring to FIG. 2, the GPU performs the first diamond cell matching search in the reference frame image according to the position of the prediction blocks, so as to determine the position and the motion vector of the desired whole pixel region. Specifically, the Step 104 may include the following steps:

Step 201, the GPU determines according to the position of the prediction blocks the center of the first diamond region in the reference frame image, and selects a plurality of the first square region in the first diamond region.

Figure 3:
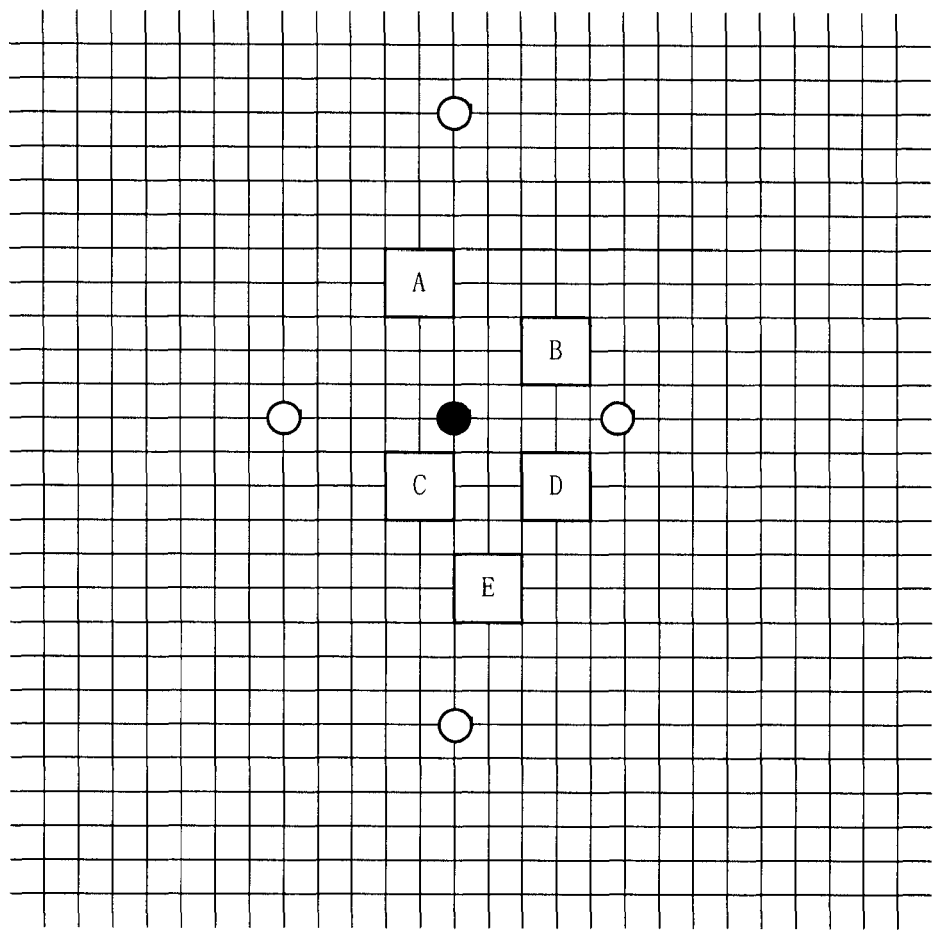
FIG. 3 is a diagram showing the diamond region and the square region in the method for motion compensation matching in video coding according to one other embodiment of the present disclosure.

For instance, the coordinates of the pixel at the upper left corner of a certain prediction block in the current frame image can be first determined, as shown by the black dot in FIG. 3. Then, in the reference frame image, a position that has the same coordinates with the position determined in the previous step is determined as the center of the first diamond area, which means the black dot is the center of the diamond shape. The area of the first diamond region, and the position of each of the boundary pixels of the first diamond region or the like are determined according to the capacity of the GPU, thereby determining each pixel included in the first diamond region.

Step 202, the GPU determines, according to the vertex pixels of the first diamond region and the boundary pixels of each of the first square regions, a plurality of first search blocks in the reference frame image, and compares the pixels of each of the first search blocks with the pixels of the prediction blocks.

Figure 4:
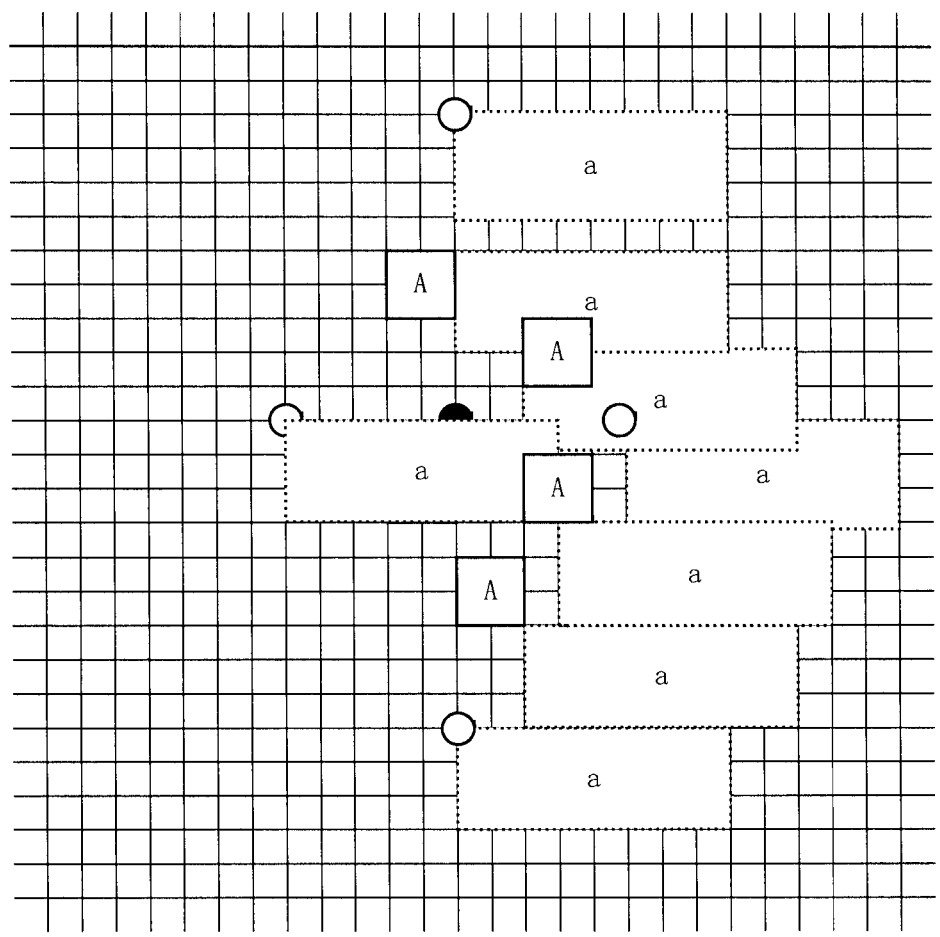
FIG. 4 is a diagram showing the search blocks in the method for motion compensation matching in video coding according to one other embodiment of the present disclosure.

For example, referring to FIG. 3, the GPU selects 4 vertex pixels of the first diamond region (the white dots shown in FIG. 3) and divides n small squares A in the first diamond region, and then selects m pixels from the boundary pixels of each of the squares A. Thus, a total of N=4+m*n pixels are selected. As shown in FIG. 4, with the positions of the selected N pixels as the upper left corner of the first search blocks, N first search blocks "a" are selected in the reference frame image, which have the same size as and corresponding coordinates with the prediction blocks. FIG. 4 merely shows a part of the first search blocks a. In fact, each of the actually selected pixels has a corresponding first search block a.

Step 203, the GPU respectively performs SAD convergence on the comparison results corresponding to each of the first search block, and obtains the position and MV of the reference block according to the result of the convergence, then performs block-wise averaging with regard to each of the first search blocks according to the reference block, so as to determine the position and the motion vector of the desired whole pixel region.

Specifically, SAD algorithm may be used for convergence of the comparison result between each of the pixels in each of the first search blocks and the pixels having corresponding positions in the prediction blocks, so as to obtain the cost (compression cost) of each of the first search blocks. The first search block having the smallest cost is determined as the most suitable reference block. According to the positional displacement between the above reference block and the prediction block, the motion vector of the reference block with regard to the prediction block is obtained. The GPU may use various dividing methods to further divide the first search blocks into a plurality of sub-regions, for example, according to the position of the reference block, dividing the N first search blocks into a plurality of 3*3 sub-regions, i.e., each 9 first search blocks forming one sub-region. The average cost of each of the search blocks in each respective sub-regions is then calculated. The sub-region with the smallest average value of cost is selected by the method of mean value as the desired whole pixel region, thereby determining the position and the motion vector of the desired whole pixel region.

It should be noted that according to the number of the selected reference frame images, the GPU executes Step 201 to Step 203 for each of the reference frame images. This process can be rapidly executed by initiating parallel threads.

In one possible implementation, in Step 104, the GPU performs, according to the position of the desired whole pixel region, the second diamond cell matching search in the interpolation images to determine the position and the motion vector of the desired sub-pixel region. Specifically, this step may include the following steps.

Step 204, the GPU determines, according to the position of the desired whole pixel region, the center of the second diamond region, and selects a plurality of second square regions in the second diamond region.

In each of the interpolation images, the center of the second diamond region is determined according to the position of the desired whole pixel region. For example, the coordinates in the reference frame image of the pixel at the upper left corner of the whole pixel region can be determined. Then, in each of the interpolation images, the position of each pixel in the whole pixel region is determined as the center of the second diamond region. The area and the position of each of the boundary pixels, etc. of the second diamond region are determined according to the capacity of the GPU, so that each of the pixels included in the second diamond region is determined. Usually, the second diamond region is smaller than the first diamond region. Therefore, the first diamond region may be deemed as a large diamond and the second diamond region may be deemed as a small diamond. According to the above example, the 9 first search blocks in the whole pixel region can determine in one interpolation image a second diamond region that includes the pixel positions of the 9 first search blocks.

Step 205, the GPU determines, according to the vertex pixels of the second diamond region and the boundary pixels of each of the second square regions, a plurality of second search blocks in the interpolation images, and compares the pixels of each of the second search blocks with the pixels of the prediction blocks.

Referring to FIGS. 3 and 4, similar to Step 202, in Step 205, the GPU selects 4 vertex pixels of the second diamond region, divides the second diamond region into s squares, and selects t pixels from the boundary pixels of each square. Thus, a total of M=4+s*t pixels are selected. With the upper left corner of the M selected pixels as the upper left corner of the second search blocks, M second search blocks that have the same size and corresponding coordinates with the prediction blocks are selected in the reference frame image.

Step 206, the GPU respectively performs SAD convergence on the comparison results corresponding to each of the second search blocks, and obtains the position and the motion vector of the desired sub-pixel region according to the result of the convergence.

In particular, SAD algorithm may be used for convergence of the comparison result between each of the pixels in each of the second search blocks and the pixels having corresponding positions in the prediction blocks, so as to obtain the cost of each of the second search blocks. The second search block having the smallest cost is determined as the desired sub-pixel region. According to the positional displacement between the above sub-pixel region and the prediction block, the motion vector of the sub-pixel region is obtained.

Figure 5:
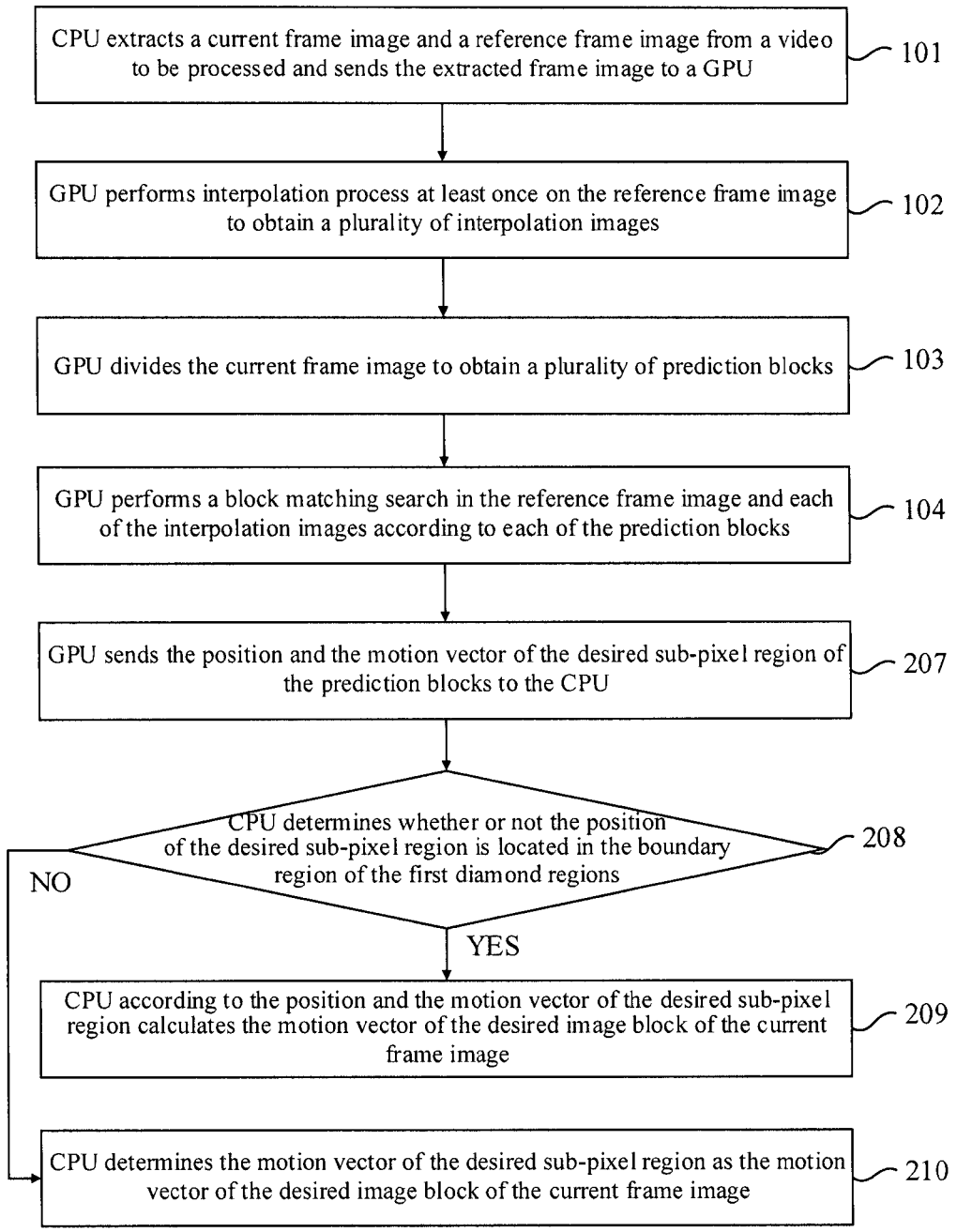
FIG. 5 is a flow chart of determining the boundary region in the method for motion compensation matching in video coding according to one other embodiment of the present disclosure.

In one possible implementation, as shown in FIG. 5, Step 105 includes the following steps.

Step 207, the GPU sends the position and the motion vector of the desired sub-pixel region of the prediction blocks to the CPU.

Step 208, the CPU determines whether or not the position of the desired sub-pixel region is in the boundary region of the first diamond regions; if yes, executes Step 209; otherwise, executes Step 210.

Specifically, the CPU may compare the position of the desired sub-pixel region with the threshold value of the boundary region of the first diamond regions to determine whether or not the position of the desired sub-pixel region is in the boundary region.

Step 209, the CPU calculates, according to the position and the motion vector of the desired sub-pixel region, the motion vector of the desired image block of the current frame image.

If the desired sub-pixel region belongs to the boundary region, the processing is independently performed by the CPU. The CPU adopts, according to the motion vector of the surrounding macroblocks, the search algorithm such as small cell and DS in a vicinity of the vector to finally obtain an optimal MV (the motion vector of the desired image block).

Step 210, the CPU determines the motion vector of the desired sub-pixel region as the motion vector of the desired image block of the current frame image.

In this embodiment, the whole pixel region and the sub-pixel region are compared to calculate the position of an optimal pixel region. If the optimal pixel region does not belong to the boundary region, then the optimal pixel region is the optimal pixel region, thereby obtaining an optimal MV.

It should be noted that though it might be preferable to determine the search blocks with the vertex pixels of the first/second diamond region in the embodiments of the present disclosure, one skilled in the art can understand that according to the actual demand for the matching accuracy, the pixels passed by the borders of the diamond regions can be selected to determine the search blocks.

The motion compensation matching method for video coding of this embodiment uses GPU to execute large amount of computation for interpolation and division of the frame images and block matching search, and uses CPU to process a small amount of computation. Since GPU is used to process search, which can be the most complicated and the most energy-consuming part of the coding process (e.g., the GPU processes about 95% of the motion module while the CPU processes about 5% of the motion module), the large-scale concurrency of the graphics card can be sufficiently utilized, and thus the video coding speed can be significantly increased.

Further, during the block matching search, diamond cell matching search is used in the example, which searches not only the vertex pixels of the diamond regions, but also the pixels of the cells (the borders of the plurality of square regions) within the diamond regions. There are larger regions searched than in some diamond algorithms, which may improve the prediction accuracy (e.g., increasing the prediction accuracy to 98% as compared to soft decoding) and reduce the quality loss (e.g., controlling the quality loss PSNR within 0.1 dB).

Embodiment 3

Figure 6:
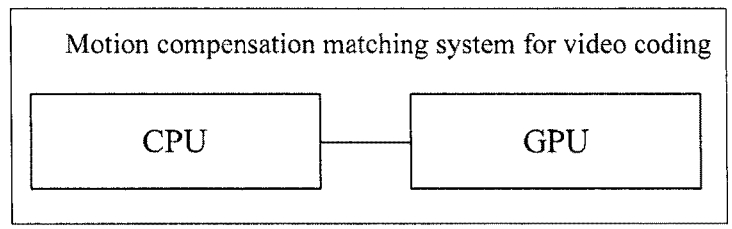
FIG. 6 is a block diagram showing the structure of a motion compensation matching system for video coding according to one embodiment of the present disclosure.

FIG. 6 is a block diagram showing the structure of a motion compensation matching system for video coding according to one embodiment of the present disclosure. Referring to FIG. 6, the motion compensation matching system for video coding comprising:

a CPU for extracting a current frame image and a reference frame image from a video to be processed and sending the extracted frame images to a GPU;

the GPU connected with the CPU, that receives the current frame image and the reference frame image from the CPU; that performs interpolation process at least once on the reference frame image to obtain a plurality of interpolation images; that divides the current frame image to obtain a plurality of prediction blocks; and that according to each of the prediction blocks, performs block matching search in the reference frame image and each of the interpolation images;

the CPU further used for determining a motion vector of a desired image block of the current frame image according to a result of the block matching search.

The motion compensation matching system for video coding of this embodiment may execute any motion compensation matching method for video coding of the aforementioned embodiments, using GPU to execute large amounts of computation for interpolation and division of the frame images and block matching search, and using CPU to process a small amount of computation. Since GPU is used to process search, which can be the most complicated and the most energy-consuming part of the coding process, the large-scale concurrency of the graphics card can be sufficiently utilized, and thus the video coding speed can be significantly increased.

Embodiment 4

Figure 7:
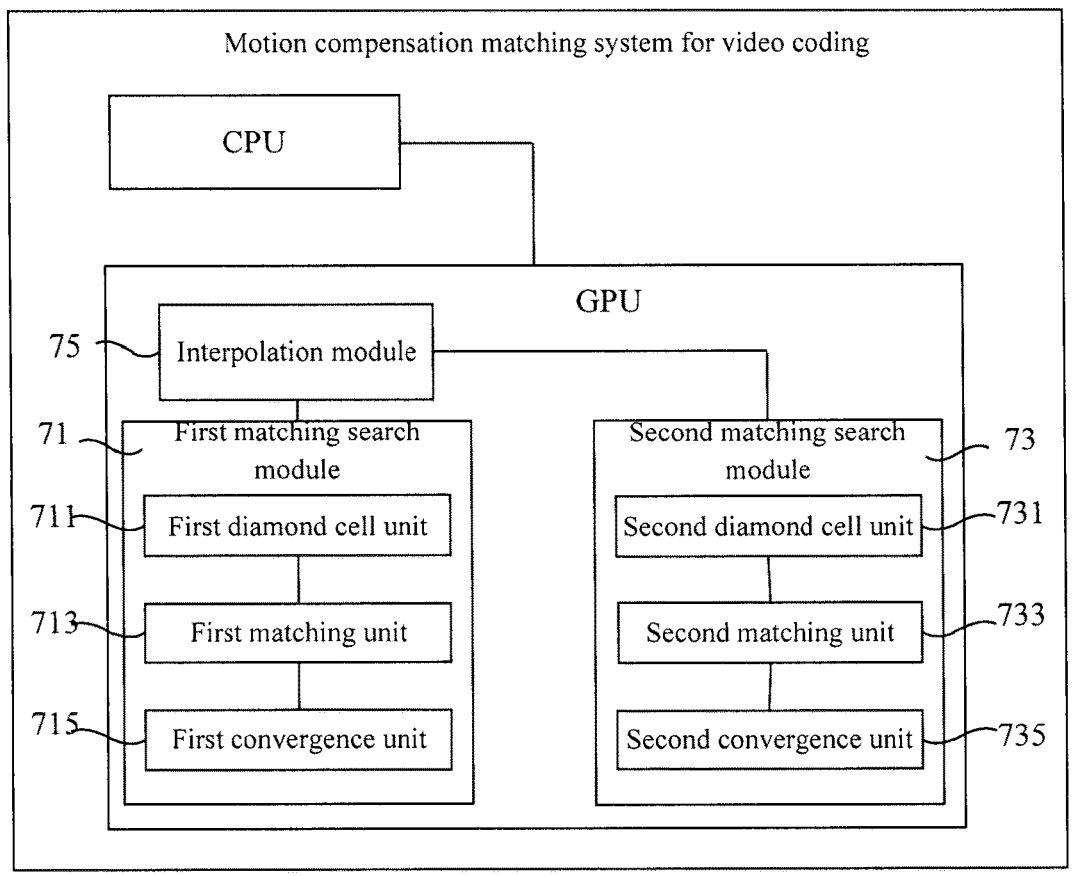
FIG. 7 is a block diagram showing the structure of a motion compensation matching system for video coding according to one other embodiment of the present disclosure.

FIG. 7 is a block diagram showing the structure of a motion compensation matching system for video coding according to one other embodiment of the present disclosure. The reference numerals in FIG. 7 that are the same with FIG. 6 refer to the sameparts. This embodiment is different from the aforementioned embodiment in that the GPU of the motion compensation matching system for video coding may include:

a first matching search module 71 for performing a first diamond cell matching search in the reference frame image according to the position of the prediction blocks, so as to determine the position and the motion vector of a desired whole pixel region;

a second matching search module 73 that is connected with the first matching search module 71, which, with regard to each of the interpolation images, is used for performing a second diamond cell matching search in the interpolation images according to the position of the desired whole pixel region, so as to determine a position and a motion vector of a desired sub-pixel region.

In one possible implementation, the first matching search module 71 includes:

a first diamond cell unit 711 for determining the center of a first diamond region according to the position of the prediction blocks, and selecting a plurality of first square regions in the first diamond region;

a first matching unit 713 that is connected with the first diamond cell unit 711, for according to the vertex pixels of the first diamond region and the boundary pixels of each of the first square regions, determining a plurality of first search blocks in the reference frame image, and comparing pixels of each of the first search blocks with pixels of the prediction blocks;

a first convergence unit 715 that is connected with the first matching unit 713, for respectively performing sum of absolute difference (SAD) convergence on the comparison result corresponding to each of the first search block, and according to the result of the convergence, obtaining a position and a motion vector of a reference block, then performing block-wise averaging with regard to each first search block according to the reference block, so as to determine the position and the motion vector of the desired whole pixel region.

In one possible implementation, the second matching search module 73 includes:

a second diamond cell unit 731 for determining the center of a second diamond region in the interpolation images according to the position of the desired whole pixel region, and selecting a plurality of second square regions in the second diamond region;

a second matching unit 733 that is connected with the second diamond cell unit 731, for determining a plurality of second search blocks in the interpolation images according to the vertex pixels of the second diamond region and the boundary pixels of each of the second square regions, and comparing pixels of each of the second search blocks with pixels of the prediction blocks;

a second convergence unit 735 that is connected with the second matching unit 733, for respectively performing SAD convergence on the comparison result corresponding to each of the second search block, and according to the result of the convergence, obtaining a position and a motion vector of the desired sub-pixel region.

In one possible implementation, the GPU is further used for sending the position and the motion vector of the desired sub-pixel region of the prediction blocks to the CPU;

the CPU is further used for determining whether or not the position of the desired sub-pixel region is located in a boundary region of the first diamond region; if yes, according to the position and the motion vector of the desired sub-pixel region, the CPU calculates the motion vector of the desired image block of the current frame image, otherwise, determines the motion vector of the desired sub-pixel region as the motion vector of the desired image block of the current frame image.

In one possible implementation, the GPU further includes: an interpolation module 75 for initiating, according to the reference frame image, multiple parallel threads to execute half pixel interpolation process to obtain half pixel interpolation images; and according to the reference frame image and the half pixel interpolation images, initiating multiple parallel threads to execute ¼ pixel interpolation process to obtain ¼ pixel interpolation images.

The motion compensation matching system for video coding of this embodiment may execute any motion compensation matching method for video coding of the aforementioned embodiments, using GPU to execute large amount of computation for interpolation and division of the frame images and block matching search, and using CPU to process small amount of computation. Since GPU is used to process search, which can be the most complicated and the most energy-consuming part of the coding process, the large-scale concurrency of the graphics card can be sufficiently utilized, and thus the video coding speed can be significantly increased.

Further, during the block matching search, the first and the second matching search modules may use diamond cell matching search not only on the vertex pixels of the diamond regions, but also on the pixels of the cells (the borders of the plurality of square regions) within the diamond regions. There are more regions searched than in some diamond algorithms, which may improve the prediction accuracy (e.g., increasing the prediction accuracy to 98% as compared to the soft decoding) and reduces the quality loss (e.g., controlling the quality loss PSNR within 0.1 dB).

Embodiment 5

Figure 8:
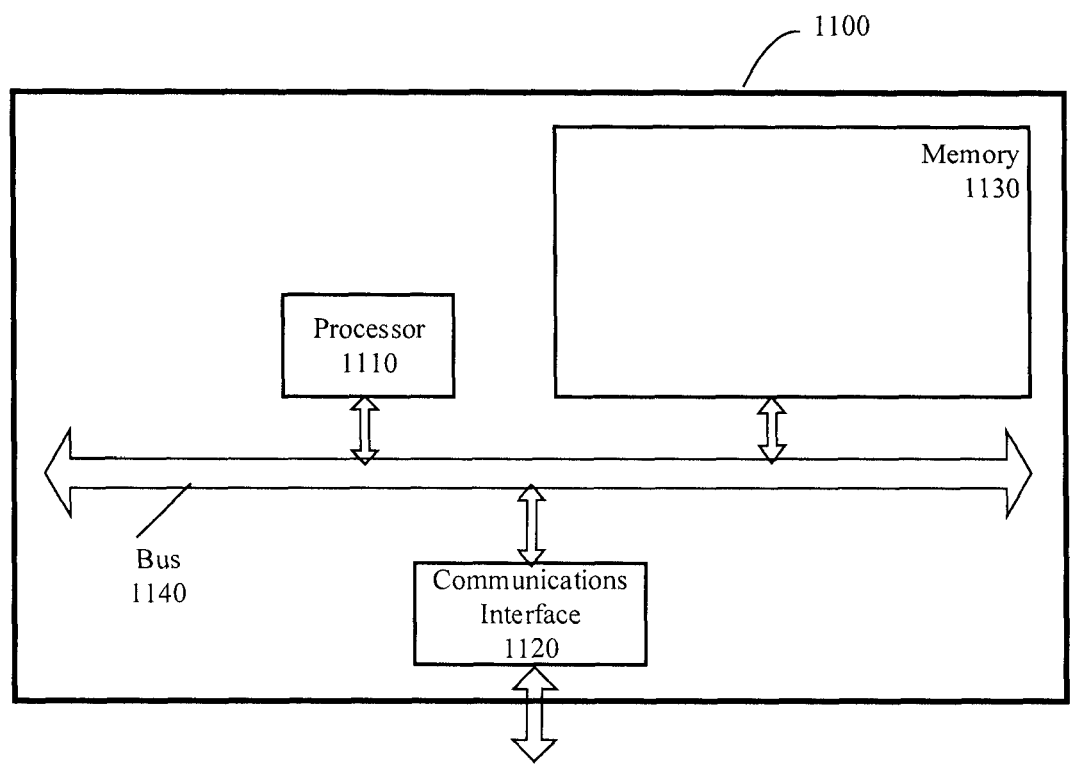
FIG. 8 is a block diagram showing the structure of a motion compensation matching system for video coding of one other embodiment of the present disclosure.

FIG. 8 is a block diagram showing the structure of a motion compensation matching system for video coding of one other embodiment of the present disclosure. The motion compensation matching system 1100 for video coding may be, for example, a host server having a computing power, a personal computer PC, or a portable computer or terminal that can be carried around. The specific embodiment of the present disclosure does not limit the specific implementation of the computing node.

The motion compensation matching system 1100 for video coding comprises a processor 1110, a communications interface 1120, a memory 1130, and a bus 1140, wherein the processor 1110, the communications interface 1120, and the memory 1130 complete communications therebetween via the bus 1140.

The communications interface 1120 is used for communications with network devices including, for example, a virtual machine management center, a shared storage and the like.

The processor 1110 is used for executing programs. The processor 1110 may be a central processing unit CPU or an ASIC (Application Specific Integrated Circuit), or be configured as one or more integrated circuits for implementing the embodiment of the present disclosure.

The memory 1130 is used for storing documents. The memory 1130 may include a high-speed RAM memory and may further include a non-volatile memory, for example, at least one magnetic disk memory. The memory 1130 may also be a memory array. The memory 1130 may be divided into blocks that can be combined to form virtual volumes according to a particular rule.

In one possible implementation, the above program may be a program code including computer operation instructions. The program may be specifically used to execute the motion compensation matching method for the video coding in Embodiment 1 or Embodiment 2.

One skilled in the art can realize that each of the exemplary units and steps of the algorithms in the embodiments described herein may be implemented by electronic hardware or a combination of computer software and electronic hardware. Whether these functions are fulfilled in the form of hardware or software depends on the particular application of the technical solution and the restrictive conditions of the design. One skilled in the art may choose various methods according to the particular application to perform the functions described, without going beyond the scope of the present disclosure.

If the above functions are implemented in the form of computer software and the software is sold or used as an independent product, it may be deemed, to some extent, that the whole or a part (for example, the part contributing over the prior art) of the technical solution of the present disclosure is presented in the form of the computer software product. The computer software product is usually stored in a computer readable non-volatile storage medium and includes several instructions so that the computing device (may be a personal computer, a server or a network device, etc.) executes all or a part of the steps of the method described in any of the embodiments of the present disclosure. The above-mentioned storage medium includes various mediums that can store program codes such as a USB disk, a mobile hard disk, a read-only memory (ROM), a random access memory (RAM), a magnetic disk, or an optical disk.

It will be appreciated that the inventive concept is not limited to the exact construction that has been described above and illustrated in the accompanying drawings, and that various modifications and changes can be made without departing from the scope the present disclosure. It is intended that the scope of the disclosure only be limited by the appended claims.

What is claimed is:

1. A motion compensation matching method for video coding, comprising:
    a central processing unit (CPU) extracting a current frame image and a reference frame image from a video to be processed and sending the extracted frame images to a graphics processing unit (GPU);
    the GPU performing an interpolation process at least once on the reference frame image to obtain a plurality of interpolation images;
    the GPU dividing the current frame image to obtain a plurality of prediction blocks;
    the GPU performing, according to each of the prediction blocks, block matching search in the reference frame image and each of the interpolation images; and
    according to a result of the block matching search, determining a motion vector of a desired image block of the current frame image,
    wherein the GPU performing, according to each of the prediction blocks, block matching search in the reference frame image comprises the GPU performing, according to a position of the prediction blocks, a first diamond cell matching search in the reference frame image to determine a position and a motion vector of a desired whole pixel region,
    the GPU performing, according to the position of the prediction blocks, the first diamond cell matching search in the reference frame image to determine the position and the motion vector of the desired whole pixel region comprises:
    the GPU determining, according to the position of the prediction blocks, a center of a first diamond region in the reference frame image, and selecting a plurality of first square regions in the first diamond region; and
    according to vertex pixels of the first diamond region and boundary pixels of each of the first square regions, determining a plurality of first search blocks in the reference frame image and comparing pixels of each of the first search blocks with pixels of the prediction blocks.

2. The method according to claim 1, wherein the GPU performing, according to each of the prediction blocks, block matching search in each of the interpolation images comprises:
    for each of the interpolation images, the GPU performing, according to the position of the desired whole pixel region, a second diamond cell matching search in the interpolation images to determine a position and a motion vector of a desired sub-pixel region.

3. The method according to claim 1, wherein the GPU performing, according to the position of the prediction blocks, the first diamond cell matching search in the reference frame image to determine the position and the motion vector of the desired whole pixel region further comprises:

performing sum of absolute difference (SAD) convergence on a respective comparison result corresponding to each of the first search blocks, obtaining a position and a motion vector of a reference block according to a result of the convergence, and performing block-wise averaging with regard to each of the first search blocks according to the reference block, so as to determine the position and the motion vector of the desired whole pixel region.

4. The method according to claim 2, wherein the GPU performing, according to the position of the desired whole pixel region, the second diamond cell matching search in the interpolation images to determine the position and the motion vector of the desired sub-pixel region comprises:

the GPU determining, according to the position of the desired whole pixel region, a center of a second diamond region in the interpolation images, and selecting a plurality of second square regions in the second diamond region;

according to vertex pixels of the second diamond region and boundary pixels of each of the second square regions, determining a plurality of second search blocks in the interpolation images and comparing pixels of each of the second search blocks with pixels of the prediction blocks; and performing sum of absolute difference (SAD) convergence on a respective comparison result corresponding to each of the second search blocks, and according to a result of the convergence, obtaining the position and the motion vector of the desired sub-pixel region.

5. The method according to claim 3, wherein according to the result of the block matching search, determining the motion vector of the desired image block of the current frame image comprises:

the GPU sending the position and the motion vector of the desired sub-pixel region of the prediction blocks to the CPU; and the CPU determining whether or not the position of the desired sub-pixel region is located in a boundary region of the first diamond region; if the position of the desired sub-pixel region is located in a boundary region of the first diamond region, the CPU calculating, according to the position and the motion vector of the desired sub-pixel region, the motion vector of the desired image block of the current frame image; and otherwise, the CPU determining the motion vector of the desired sub-pixel region as the motion vector of the desired image block of the current frame image.

6. The method according to claim 1, wherein the GPU performing interpolation process at least once on the reference frame image to obtain the plurality of interpolation images comprises:

the GPU initiating, according to the reference frame image, multiple parallel threads to execute half pixel interpolation process, so as to obtain half pixel interpolation images; and the GPU initiating, according to the reference frame image and the half pixel interpolation images, multiple parallel threads to execute ¼pixel interpolation process, so as to obtain ¼interpolation images.

7. A motion compensation matching system for video coding, comprising:

a CPU for extracting a current frame image and a reference frame image from a video to be processed and sending the extracted frame images to a GPU; and the GPU connected with the CPU, for receiving the current frame image and the reference frame image from the CPU, performing an interpolation process at least once on the reference frame image to obtain a plurality of interpolation images, dividing the current frame image to obtain a plurality of prediction blocks, and according to each of the prediction blocks, performing block matching search in the reference frame image and each of the interpolation images, wherein the CPU is further configured to determine a motion vector of a desired image block of the current frame image according to a result of the block matching search, the GPU comprises a first matching search module for performing a first diamond cell matching search in the reference frame image according to the position of the prediction blocks, so as to determine a position and a motion vector of a desired whole pixel region, the first matching search module comprises:

a first diamond cell unit for determining a center of a first diamond region according to the position of the prediction blocks, and selecting a plurality of first square regions in the first diamond region; and a first matching unit connected with the first diamond cell unit, for determining a plurality of first search blocks in the reference frame image according to vertex pixels of the first diamond region and boundary pixels of each of the first square regions, and comparing pixels of each of the first search blocks with pixels of the prediction blocks.

8. The system according to claim 7, wherein the GPU further comprises:

a second matching search module connected with the first matching search module, for performing, with regard to each of the interpolation images, a second diamond cell matching search in the interpolation images according to the position of the desired whole pixel region, so as to determine a position and a motion vector of a desired sub-pixel region.

9. The system according to claim 7, wherein the first matching search module further comprises:

a first convergence unit connected with the first matching unit, for performing sum of absolute difference (SAD) convergence on a respective comparison result corresponding to each of the first search block, obtaining a position and a motion vector of a reference block according to a result of the convergence, and performing block-wise averaging with regard to each first search block according to the reference block, so as to determine the position and the motion vector of the desired whole pixel region.

10. The system according to claim 8, wherein the second matching search module comprises:

a second diamond cell unit for determining a center of a second diamond region in the interpolation images according to a position of the desired whole pixel region, and selecting a plurality of second square regions in the second diamond region;

a second matching unit connected with the second diamond cell unit, for determining a plurality of second search blocks in the interpolation images according to vertex pixels of the second diamond region and boundary pixels of each of the second square regions, and comparing pixels of each of the second search blocks with pixels of the prediction blocks; and a second convergence unit connected with the second matching unit, for performing sum of absolute difference (SAD) convergence on a respective comparison result corresponding to each of the second search block, and according to a result of the convergence, obtaining the position and the motion vector of the desired sub-pixel region.

11. The system according to claim 9, wherein the GPU is further configured to send the position and the motion vector of the desired sub-pixel region of the prediction blocks to the CPU; and the CPU is further configured to determine whether or not the position of the desired sub-pixel region is located in a boundary region of the first diamond region; if the position of the desired sub-pixel region is located in a boundary region of the first diamond region, the CPU calculates, according to the position and the motion vector of the desired sub-pixel region, a motion vector of the desired image block of the current frame image; and otherwise, the CPU determines the motion vector of the desired sub-pixel region as the motion vector of the desired image block of the current frame image.

12. The system according to claim 7, wherein the GPU further comprises: an interpolation module for initiating multiple parallel threads to execute half pixel interpolation process according to the reference frame image, so as to obtain half pixel interpolation images, and initiating, according to the reference frame image and the half pixel interpolation images, multiple parallel threads to execute ¼pixel interpolation process, so as to obtain ¼pixel interpolation images.

13. A computer program product, stored on a non-transitory computer-readable medium, the computer program comprising instructions that when executed by a processor cause the processor to perform the motion compensation matching method according to claim 1.

14. A non-transitory computer readable storage medium encoded with computer program instructions that when executed by a processor cause the processor to perform the motion compensation matching method according to claim 1.

* * * * *